Oct. 26, 1965

C. B. KING ETAL 3,213,567

GEAR GRINDING MACHINE AND METHOD OF DRESSING
THE GRINDING WHEEL THEREOF

Filed Sept. 26, 1963

*INVENTORS*
CHARLES B. KING
RICHARD W. TREVERTON
BY
*Richard W. Treverton*
ATTORNEY

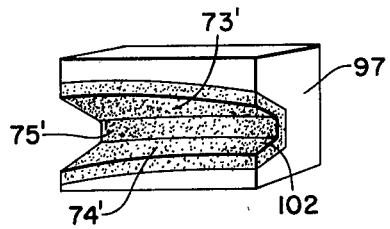
FIG. 7
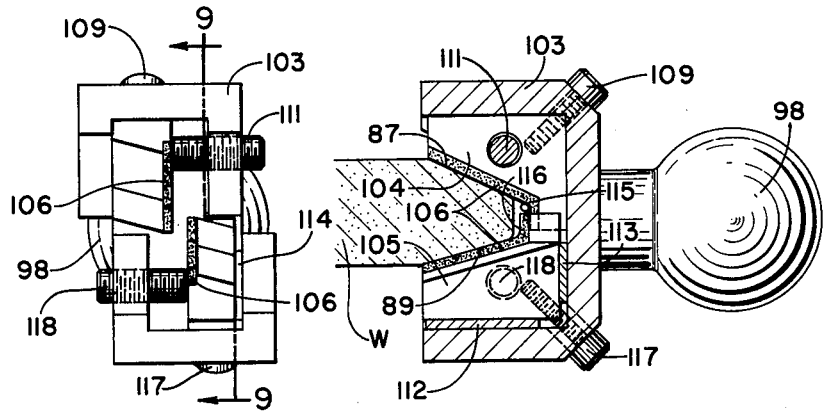
FIG. 8    FIG. 9
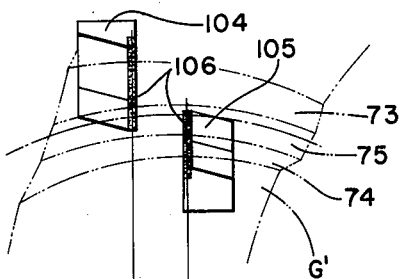
FIG. 10
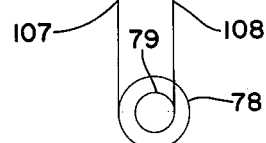

United States Patent Office 3,213,567
Patented Oct. 26, 1965

3,213,567
GEAR GRINDING MACHINE AND METHOD OF DRESSING THE GRINDING WHEEL THEREOF
Charles B. King and Richard W. Treverton, Rochester, N.Y., assignors to The Gleason Works, Rochester, N.Y., a corporation of New York
Filed Sept. 26, 1963, Ser. No. 311,705
14 Claims. (Cl. 51—3)

The present invention relates to a machine for grinding spiral bevel or hypoid gears and to a method of dressing the grinding wheel of such a machine.

Co-pending application Serial No. 311,704, filed by C. B. King on even date herewith, discloses a method and machine for simultaneously producing the opposite tooth sides of spiral bevel and hypoid gears as involute helicoidal surfaces, by swinging a rotating grinding wheel through the tooth slots in a helical path along and about a helix axis inclined to the axis of rotation of the wheel. Except in a special case where the grinding wheel axis lies in a plane that is parallel to the helix axis and normal to the helicoidal tooth side being produced, the profile of the wheel in the wheel axial plane is curved, and this curvature varies with change in wheel diameter and with change in position of the wheel axis relative to the helix axis. Accordingly the dressing and redressing of the wheel to such shape has been difficult except in the special case mentioned, and is especially difficult where a wheel diameter change necessarily results from redressing. In the case of the simultaneous grinding of opposite sides of the tooth slot the problem of wheel dressing is further complicated by the fact that the normal planes of the opposite sides are non-coincident and that the axial section profiles of the grinding wheel for the two sides are therefore different.

The primary object of the present invention is a method and machine whereby the grinding wheel may be dressed to the correct profile shape without regard to the wheel diameter or the positional relation of the wheel rotation axis to the helix axis. A further object is such a method and machine whereby the outside and inside surfaces of an annular grinding wheel may be simultaneously dressed to the appropriate profile curvatures for grinding the concave and convex sides of the tooth slots simultaneously as involute helicoidal surfaces. Yet another object is a method and machine whereby the dressing may be effected with dresser bits whose profiles for shaping the tooth side grinding surfaces of the wheel are straight and hence easily formed. A still further object in such a machine and method wherein the wheel dressing may be carried out by essentially the same motions that are required for the gear grinding operation.

The foregoing and other objects and advantages of the invention will appear from the following description of the preferred method and machine embodiments illustrated in the accompanying drawings, wherein:

FIG. 7 is a perspective view of a wheel dressing tool;

FIGS. 8 and 9 are respectively front and side views of a modified dressing tool;

FIG. 10 is a diagram illustrating the relationship between the helicoidal tooth surfaces and the dressing tool of FIGS. 8 and 9.

Figure 1:
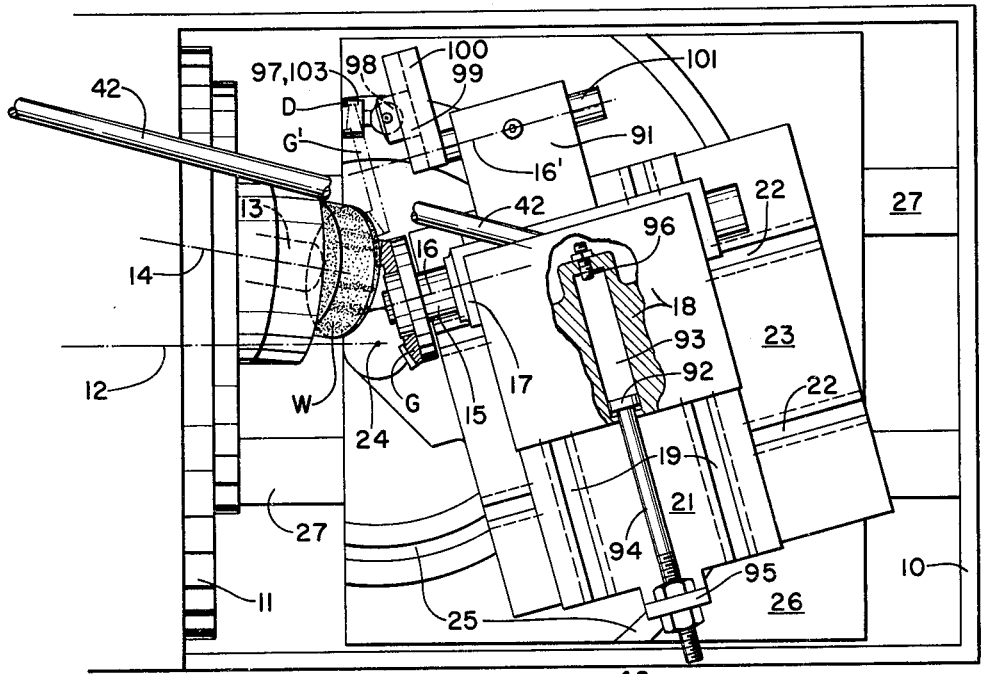
FIGS. 1 and 2 are respectively a plan view and a drive diagram of the machine.

The machine is essentially like that described in said co-pending application. It comprises a frame 10 supporting a tool carrying cradle 11 for rotation about horizontal axis 12, the tool being an annular grinding wheel W mounted on a spindle 13 whose rotation axis is designated 14. By any suitable means, such as those disclosed in Patent No. 2,667,818, to A. L. Stewart et al., the spindle 13 is supported for universal angular adjustment and also for radial adjustment on the cradle, so that the axes 12 and 14 may be either coincident or parallel, or relatively inclined and either intersecting or offset.

The work gear G is supported by a suitable work holder on a work spindle 15 journaled for rotation about horizontal axis 16 in a work head 17. A column 18 supports the work head for vertical adjustment thereon, to raise or lower the work spindle axis 16 relative to cradle axis 12. The column is adjustable horizontally, perpendicularly to axis 16, along ways 19 on a plate 21 which itself is adjustable horizontally, parallel to axis 16, along ways 22 on a swinging base 23. The latter is adjustable about vertical axis 24 and along arcuate ways 25 on a sliding base 26 which is movable, for relative feed between the tool and work, along ways 27 on frame 10, parallel to the cradle axis 12 which, as shown, intersects vertical axis 24.

Figure 2:
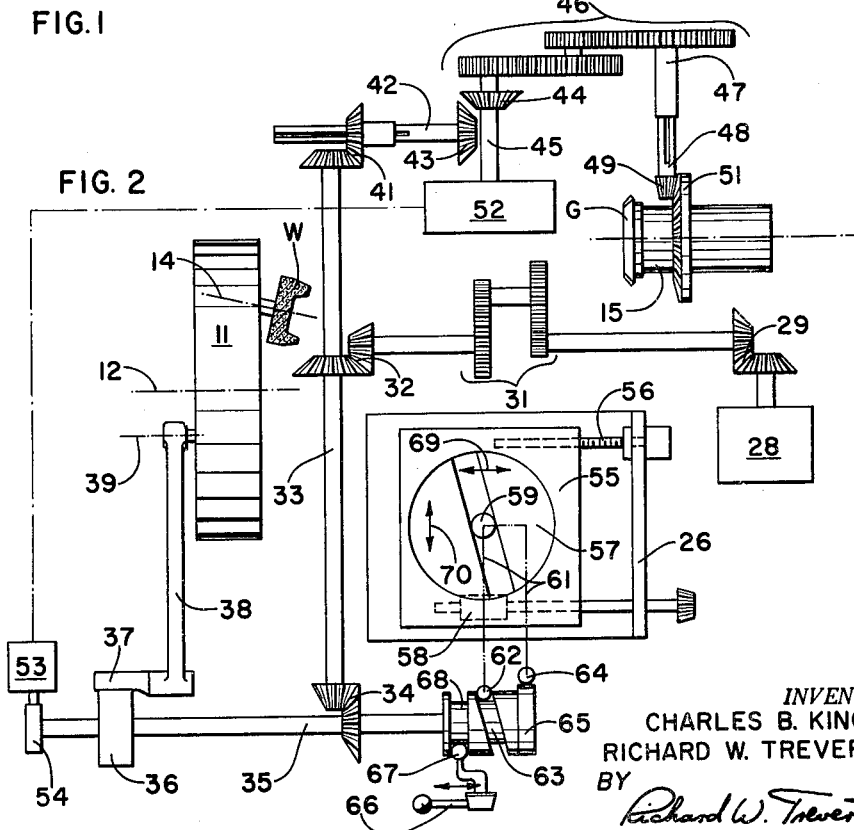

Referring to FIG. 2, the drive for the machine includes a motor 28, bevel gears 29, cycle speed change gears 31, bevel gears 32 and vertical shaft 33, all supported by frame 10. The cradle is driven from shaft 33 through bevel gears 34, horizontal shaft 35 and cradle roll cam 36. This cam when rotated oscillates a cam follower lever 37 that is fulcrumed on the frame and pivoted to a connecting rod 38 that is also pivoted, on axis 39, to the cradle 11, with the result that the cradle is rocked back and forth about axis 12 once for each revolution of the cam. Suitable biasing means, not shown, are provided to hold the follower lever 37 against the cam. The pivot on axis 39 is adjustable on the cradle around axis 12 by suitable means, not shown, to enable the cutter to be placed in any desired position around the latter axis. The lever 37 is of a kind which is adjustable, in a known manner, to vary the angle through which the cradle is rocked. If desired this lever and connecting rod 38 may be replaced by an adjustable ratio mechanism of the kind disclosed in patent No. 3,046,799, to J. L. Ash II et al.

For generating gears in a known manner, as described in the co-pending application Serial No. 311,712, filed on even date herewith by J. L. Ash II, the work spindle 15 is driven from shaft 33 through bevel gears 41 and horizontal overhead shaft 42; then through bevel gears 43 and 44, shaft 45, index change gears 46, and upper section 47 of a telescoping vertical shaft, all supported in the upper portion of column 18; and then through lower section 48 of the vertical telescoping shaft, a pinion 49 and gear 51 on spindle 15, all supported in work head 17. However, the present invention relates to the grinding of non-generated gears, and for this purpose the gear 44 is disengaged from gear 43 and the shaft 45 is connected to an indexing mechanism 52 for intermittent rotation thereby. The indexing mechanism, controlled by an electrical switch 53 actuated by a cam 54 on shaft 35, may be of the kind disclosed in the last-mentioned co-pending application. This mechanism operates to rotate the shaft 45 through one turn upon each closure of switch 53, i.e. once during each revolution of shaft 35, to effect tooth-to-tooth rotation of work spindle 15.

The feed mechanism for sliding base 26 may be substantially as disclosed in Patent 2,444,551, to O. F. Bauer. As shown schematically in FIG. 2 this mechanism includes a plate 55 adjustable on the sliding base 26, in the direction of the latter's sliding motion, by means of a screw 56. A cross-slotted disc 57 is rotatably adjustable on the plate by means of a screw 58, to vary the inclination of the slot. A roller 59 in the slot is carried by a lever, schematically shown at 61, which is pivoted to the frame 10 for motion about two mutually perpendicular axes. The lever also carries two cam follower rollers, one being roller 62 engaged with feed cam 63 and the other being roller 64 engaged with a disc cam 65. These cams are co-rotatable with shaft 35, and may be manually shifted axially thereon by a control lever 66 whose shaft supports eccentrically thereon a roller 67 that is engaged in a circumferential groove 68 in the body of cam 63.

The arrangement is such that upon rotation of shaft 35 the cam 63 acts to move roller 59 in the direction of arrow 69 to effect infeed and withdrawal motions of the sliding base (for work gear indexing by the means 52, 53), and that the cam 65 acts to move roller 59 in the direction of arrow 70. When the slot of disc 57 is inclined, i.e. is non-perpendicular to arrow 69, the motion of roller 59 effected by cam 65 also produces a motion of the sliding base in the direction of arrow 69, such motion being superimposed upon the sliding base motion produced by cam 63. The motion of the cam body effected through control lever 66 is also imparted to roller 59 through cam 63 and lever 61, and is employed to withdraw the sliding base to work-loading position after the cutting of a gear has been completed and then to advance the base to work-cutting position after a fresh gear or gear blank has been chucked to the work spindle.

For grinding non-generated gears of tapering tooth depth with helicoidal tooth sides, the form and phase relation of cams 36, 54, 63 and 65 is preferably such that cam 63 feeds the work gear into full cutting depth relative to the rotating wheel W while cam 36 holds the cradle in the position thereof wherein the wheel is just clear of the tooth slot to be ground, at one end of the slot, and, that while a dwell of cam 63 is effective at the end of this infeed, cam 36 swings the wheel through the slot about axis 12 to a position clear of the slot at the opposite end thereof. The wheel is rotated about its axis 14 by a suitable motor, not shown, and during the swing about axis 12 grinds one or both of the sides of the slot, and if desired also the bottom of the slot. Cam 63 then withdraws the work clear of the wheel and cam 36 effects an idle return swing about axis 12. Cam 54 causes tooth-to-tooth indexing of the work by mechanism 52 during this return swing. Cam 65 acts during the forward or grinding swing to effect relative motion between the wheel and work along the axis of swing, axis 12, so that the tooth surfaces are ground as helicoidal surfaces. An idle return axial motion is effected by cam 65 during the idle return swing of the wheel effected by cam 36. Depending upon the shape of cam 36 and the inclination of the slot in disc 57, the grinding swing may carry the wheel W either from the radially outer end of the tooth slot to the radially inner end thereof, or from the inner end to the outer end. Provided that the teeth have previously been cut close to finished size, they may be finish ground in one or a few passes of the grinding wheel. If more than one pass is required, then after all of the teeth around the gear have been ground on one pass, the sliding base may be set in by adjustment of screw 56 and the grinding operation repeated. The grinding wheel may be redressed when necessary, and, to compensate for stock attrition, the sliding base may be advanced toward the wheel, for example by turning screw 56 either manually or by known automatic feed means, preferably before each dressing operation. Or, instead, the wheel may be advanced relative to the cradle and toward the work along the axis 14 of the wheel, for example by a mechanism such as is disclosed in Patent No. 2,566,402, by W. C. Critchley et al.

The helicoidal tooth surfaces preferably are involute helicoids, i.e. surfaces which have straight line generatrices and which intersect planes perpendicular to the helix axis in curves which are involutes of a circle. The lead of the helix, set by adjusting slotted disc 57, is such that while the helix axis is perpendicular to the face plane of the gear, or at least lies in a plane that is perpendicular to such face plane, the wheel follows along the root plane of the tooth slot as it swings through the slot. This helical grinding path of the wheel is preferably of constant lead, achieved by keeping the axial motion effected by cam 65 in constant velocity ratio to the swing motion effected by cam 36.

Figure 3:
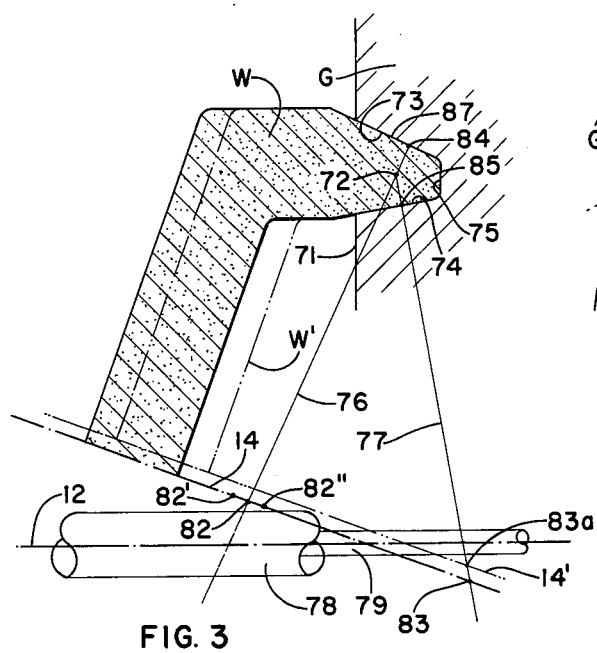
FIGS. 3 and 4 are diagrams, respectively in a plane containing the swing axis and a plane perpendicular thereto, illustrating the relationships of the grinding wheel rotation and swing axes.
Figure 4:
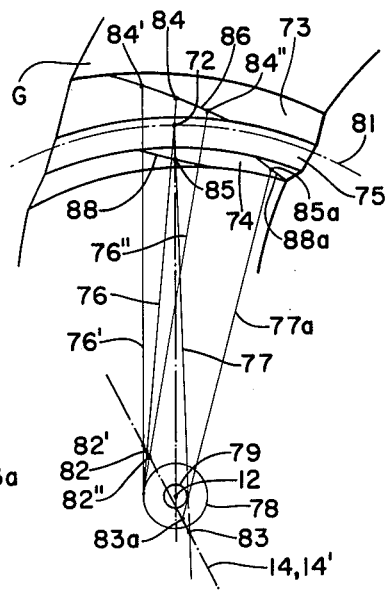
Figure 5:
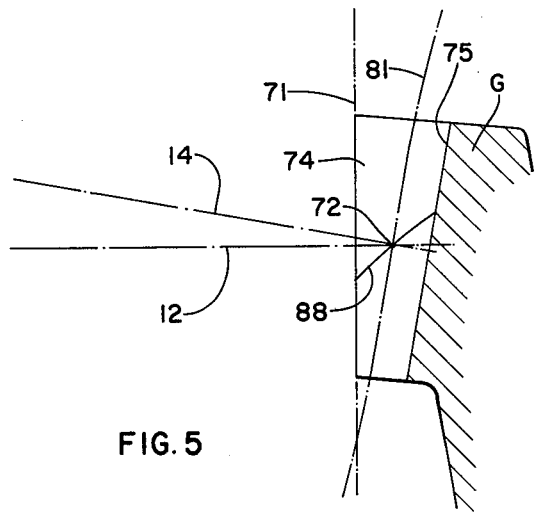
FIG. 5 is a diagram in a plane perpendicular to both FIGS. 3 and 4.

In FIGS. 3 to 5 the cradle or swing axis 12 is shown as perpendicular to the face plane 71 of gear G in a section of the latter through a mean point 72 of the tooth slot whose concave and convex sides and bottom are designated 73, 74 and 75 respectively. Surfaces 73 and 74 being involute helicoids, their respective normals 76 and 77 through the mean point are tangent to respective involute base cylinders 78 and 79.

The surfaces 73 and 74 have straight line elements only in planes tangent to their respective base cylinders, and hence can have straight line contact with a grinding wheel only if the axis of the wheel also lies in such tangent planes. For grinding both tooth sides simultaneously the wheel axis 14 is preferably tilted to lie in a plane normal to the mean helix 81 through the tooth space, i.e. the helix about axis 12 and through mean point 72 whose axial lead is the same as that of the helicoidal surfaces 73, 74.

Figure 6:
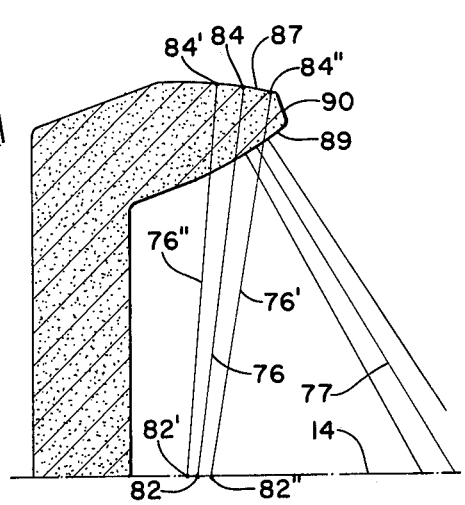
FIG. 6 is a diagram illustrating the profile curvature of the grinding wheel in axial section.

Thus tilted, as shown in FIGS. 3, 4 and 5, the wheel axis 14 is inclined to both of the base cylinder tangent planes through the mean point 72, intersection normal 76 at point 82 and normal 77 at point 83. These normals intersect the tooth surfaces 73 and 74 respectively at points 84 and 85. Through other points along axis 14, such as 82' and 82", there are other normals to surface 73, such as 76' and 76", which intersect this surface at points 84' and 84". The intersection points 84', 84, 84" lie along a curve 86 on the tooth surface 73 which constitutes an instantaneous line of contact between the tooth surface and the outside surface 87 of the wheel. By rotating a series of such normals as 76', 76 and 76" about the wheel axis 14 into a common axial plane, as FIG. 6, the profile curvature of wheel surface 87 may be determined. By a like procedure the line of contact 88 between the tooth surface 74 and the inside surface 89 of the wheel, and the profile curvature of the wheel in axial section, FIG. 6, may be determined.

With other positions of axis 14 the lines of contact 86, 88 and the profiles of wheel surfaces 87, 89 are differently curved. For example if by redressing the wheel and making a compensating advance of it along axis 12, to bring it to the position in which it is shown in broken lines at W' in FIG. 3, its axis will shift to 14'. Normal 77 will not intersect this axis 14'; point 83a on axis 14' is the intersection of the latter with a normal 77a to the tooth surface 74 at a point 85a that is spaced substantially from point 85; the reduction in wheel diameter has shifted the line of contact from 88 to 88a and given it a different curvature, and has also required a change in the axial section profile of wheel surface 89.

The present invention obviates the difficulty of dressing the outside and inside surfaces of the wheel to differently curved profiles for each different position of the wheel axis relative to the swing axis 12, and in fact even makes it unnecessary to predetermine the wheel profile curvatures. Dressing is accomplished by means of a dresser tool which, like the involute helicoidal tooth surfaces 73, 74 themselves, is straight in a normal plane parallel to the helix axis 12, and which, during the dressing operations occupies the same relation and has the same relative motion to the wheel as the work gear does during the grinding operation. If desired the same tool may also dress the tip surface 90 of the wheel for grinding bottoms 75 of the tooth slots as helicoidal surfaces.

Referring again to FIG. 1, the dresser tool D, which may be thought of as representing a tooth slot of an imaginary gear G' that is identical with the work gear G, is supported by bracket 91 that is rigidly secured to work head 17. A piston 92 operating in a cylinder 93 in the column 18 is adjustably connected by rod 94 to flange 95 of plate 21, and an adjustable stop 96 for adjusting the relative stroke of the cylinder and piston to correspond with the distance between axis 16 of gear G and axis 16' of gear G'. By adjustment of rod 94 in flange 95 the work spindle axis 16 may be brought to intersecting relation or to a desired offset from vertical axis 24.

By first withdrawing sliding base 26, then applying fluid pressure to shift the cylinder 93 to the limit of its stroke, downwardly in FIG. 1, and then advancing the sliding base, the dresser gear G', represented by dresser D, may be brought into exactly the same position relative the wheel W that the gear G occupies during the gear grinding operation. To provide wheel stock for dressing, the sliding base may be advanced relative to plate 55, FIG. 2, by means of screw 56 while the sliding base is withdrawn. Dressing of the wheel is then effected by operating the machine through its normal tooth slot grinding cycle, although preferably at a slower speed. After dressing, the gear G is returned to its normal grinding position by actuation of sliding base 26 and piston-cylinder 92, 93.

In order that the dresser D may be positioned to exactly represent the tooth slot of gear G' its body 97 or 103 may have rigid therewith a spherical portion 98 that may be secured, in any angular position about the sphere center, in a spherical recess in a slide 99. This slide is adjustable radially along a guide groove in an arm 100 rigid with a round bar 101 that is adjustable in bracket 91 both along and about axis 16' of gear G'.

The dresser body 97 may comprise a block, as shown in FIG. 7, having formed therein, as by moulding for example, a dresser bit 102 comprising a suitable matrix supporting finely divided particles of diamond or other abrasive material, the bit being formed with a wheel-engaging slot having helicoidal concave and convex sides 73' and 74' and helicoidal bottom 75' corresponding exactly in shape of the surfaces of the tooth slot to be ground in gear G, for example the surfaces 73, 74 and 75 in FIG. 4.

A modified dresser body 103, FIGS. 8 and 9, has secured therein a pair of dresser bits 104 and 105 having relatively narrow grinding wheel engaging portions 106 containing diamond or other abrasive particles. This portion of each bit is adapted to engage one side and the tip of the wheel, and also the edge radius, if any, between the side and tip. As shown in FIG. 10, the wheel engaging portions lie in parallel planes 107 and 108 tangent to the base cylinders 78 and 79 of the involute helicoidal tooth sides of the tooth slot (of gear G') which the dresser represents. In these planes the wheel side-engaging portions are straight. One dresser bit, 104, is secured in fixed position in the body 103 by screws 109 and 111; the other bit, 105, is preferably adjustable in the body, as by means of shims 112 and 113 which control the positions of its wheel side and wheel tip engaging portions (relative to the corresponding portions of bit 104) and shim 114 which controls its spacing from bit 104, i.e. enables adjustment of the dresser for changes in the combined radial dimensions of base cylinders 78 and 79. As shown, both dresser bits 104, 105 preferably have portions 115 and 116 for contact with tip face 90 of the wheel which are disposed in the respective normal planes 107, 108. By reason of the effective overlap of those portions 115, 116, the adjustment afforded by shim 112 affords a means for dressing the wheel surface 90 to different widths. Bit 105 is secured in body 103 by screws 117 and 118, the latter extending through an elongate slot in the body to permit the adjustment by replacement of shim 114.

Figure 11:
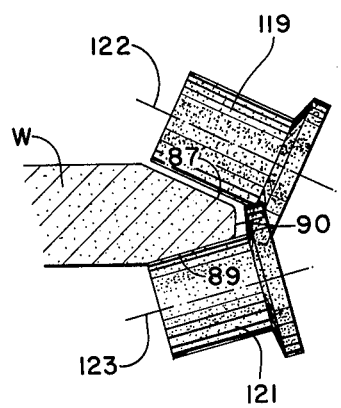
FIGS. 11 and 12 are respectively side and front views of a further modification of the dressing tool.
Figure 12:
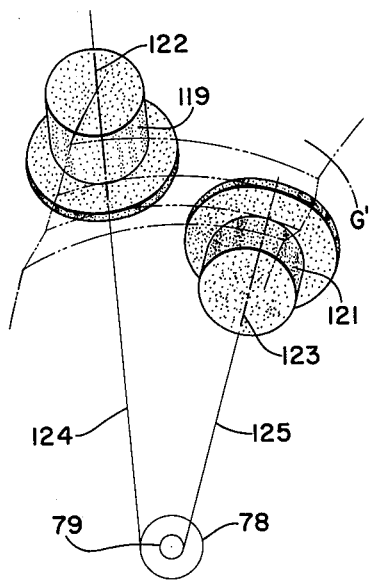

The active elements of the dresser, i.e. bits 104, 105, may if desired be replaced by dresser wheels of either the abrading or crushing type. As shown schematically in FIGS. 11 and 12, dresser bits comprising wheels 119 and 121 are so positioned by their supports (not shown) on slide 99, FIG. 1, that their axes, 122 and 123, respectively lie in planes 124 and 125 which are tangent to base cylinders 78 and 79. Accordingly they have straight line elements, in planes normal to the tooth surfaces, for contact with the grinding wheel W, this being a feature common to all of the dressers of FIGS. 7 to 12. The flanges of wheels 119 and 121 may, if desired, be positioned to dress the tip surface 90 of the wheel.

It will be understood that the foregoing description is made by way of illustration and example and not by way of limitation, and that various changes may be made in the practice of the invention without departing from the spirit thereof or from the scope of the appended claims.

What we claim is:

1. The method of dressing a surface of revolution on a grinding wheel, for grinding spiral bevel or hypoid gears by swinging the wheel in a helical path relative to the gear through a tooth space of the gear with the axis of helical motion inclined to the rotation axis of the wheel, to thereby cause said surface of revolution of the wheel to produce a helicoidal tooth surface on the gear, which method comprises effecting a relative swinging motion between the rotating wheel and a wheel-dressing tool through a helical path along and about said axis of helical motion that substantially duplicates the first-mentioned helical path and with the wheel in line contact with a surface of the tool which represents said helicoidal tooth surface in profile shape.

2. The method of claim 1 in which said dressing tool is arranged to dress the grinding wheel along a straight line disposed in a plane normal to the represented helicoidal tooth surface and parallel to said axis of helical motion.

3. The method of dressing inner and outer surfaces of revolution on an annular grinding wheel, for grinding spiral bevel or hypoid gears by swinging the wheel in a helicoidal path relative to the gear through a tooth space of the gear with the axis of helical motion inclined to the rotation axis of the wheel to thereby cause said inner and outer surfaces of revolution of the wheel to produce concave and convex helicoidal tooth surfaces on the opposite sides of said tooth space, which method comprises effecting a relative swinging motion between the rotating wheel and a wheel dressing tool along and about said axis of helical motion that substantially duplicates the first-mentioned helical path, and with the wheel in contact with surfaces of the tool which represent said helicoidal tooth surfaces in profile shape.

4. The method of claim 3 in which said tooth surfaces are involute helicoids and said dressing tool is arranged to dress said inner and outer surfaces of revolution of the grinding wheel each along a straight line disposed in a plane normal to the represented helicoidal surface and parallel to said axis of helical motion, said normal planes lying on opposite sides of said axis of helical motion.

5. The method of claim 4 in which said dressing tool is arranged to dress the tip surface of revolution of the grinding wheel which extends between said inner and outer surfaces of revolution, the portions of the tool for dressing said tip surface being disposed in each of said planes normal to the represented helicoidal surface.

6. A bevel or hypoid gear grinding machine comprising a gear support and an annular grinding wheel carrier arranged for relative helical motion along and about a helix axis inclined to the axis of rotation of the wheel, drive means for effecting such relative helical motion, and a dressing tool for the grinding wheel adapted to be positioned on the gear support, in the place of a work gear on the gear support, for dressing the wheel by repetition of said relative helical motion.

7. A machine according to claim 6 in which there are means for securing the dressing tool to said gear support, and the latter is movable on the machine to carry a work gear thereon into and out of working position relative to said grinding wheel and to simultaneously carry said dressing tool secured thereto respectively out of and into working position relative to said grinding wheel.

8. A machine according to claim 7 in which there are means for adjusting said dressing tool upon said gear support to cause the tool to represent tooth surfaces of gears of different designs.

9. A machine according to claim 6 for grinding helicoidal tooth surfaces on work gears, in which the dressing tool is arranged to dress the grinding wheel along a straight line in a plane normal to such helicoidal tooth surface and parallel to the helix axis.

10. A machine according to claim 9 in which said dresser tool comprises a dresser bit which is a roller having a surface of revolution adapted to contact the wheel along said straight line, the axis of the roller being disposed in said normal plane.

11. A machine according to claim 9 in which said roller has a flange for dressing contact with the tip surface of the wheel.

12. A machine according to claim 6 for grinding helicoidal tooth surfaces on the convex and concave sides of the tooth slots of work gears, in which the dressing tool is arranged to dress the inner and outer surfaces of the grinding wheel each along a straight line disposed in a plane normal to the related helicoidal tooth surface and parallel to said axis of helical motion, said normal planes lying on opposite sides of said helix axis.

13. A machine according to claim 12 in which said dressing tool comprises a holder supporting dresser bits respectively for the convex and concave sides of the grinding wheel, said bits having straight line elements in parallel planes for dressing contact with said sides, and means for relatively adjusting said bits in said holder to vary the spacing of said parallel planes.

14. A machine according to claim 13 having dresser bits with portions inclined to said straight line elements for dressing contact with the tip surface of the grinding wheel extending between said convex and concave sides thereof, and means for relatively adjusting said bits in said holder to vary the spacing thereof in a direction parallel to said planes, to thereby vary the dressing width of said tip surface.

References Cited by the Examiner
UNITED STATES PATENTS
2,839,873   6/58   Baxter _____ 51—33

References Cited by the Applicant
UNITED STATES PATENTS

| | | |
|---|---|---|
| 1,721,103 | 7/29 | Candee et al. |
| 1,830,971 | 11/31 | Taylor. |
| 1,982,050 | 11/34 | Gleason et al. |
| 2,444,551 | 7/48 | Bauer. |
| 2,566,402 | 9/51 | Critchley et al. |
| 2,667,818 | 2/54 | Stewart et al. |
| 2,857,819 | 10/58 | Wildhaber et al. |

LESTER M. SWINGLE, *Primary Examiner.*